United States Patent [19]

Fazio

[11] 3,891,889

[45] June 24, 1975

[54] COLOR CONVERGENCE APPARATUS FOR A COLOR TELEVISION TUBE

[75] Inventor: James Anthony Fazio, Liverpool, N.Y.

[73] Assignee: The Singer Company, New York, N.Y.

[22] Filed: Feb. 6, 1974

[21] Appl. No.: 440,111

Related U.S. Application Data

[63] Continuation of Ser. No. 287,523, Sept. 8, 1972, which is a continuation-in-part of Ser. No. 138,492, April 29, 1971, abandoned.

[52] U.S. Cl. ................................................ 315/368
[51] Int. Cl. ........................................... H01j 29/70
[58] Field of Search ......... 315/27 TD, 27 R, 27 BC, 315/27 XY, 276 D, 368

[56] References Cited

UNITED STATES PATENTS

| | | | |
|---|---|---|---|
| 3,307,067 | 2/1967 | Jachim | 315/13 C |
| 3,340,422 | 9/1967 | Bull | 315/13 C |

*Primary Examiner*—Maynard R. Wilbur
*Assistant Examiner*—J. M. Potenza
*Attorney, Agent, or Firm*—James F. Duffy; James C. Kesterson

[57] ABSTRACT

The convergence coils of a convergence yoke are provided components of current which are related to currents in a deflection yoke.

7 Claims, 1 Drawing Figure

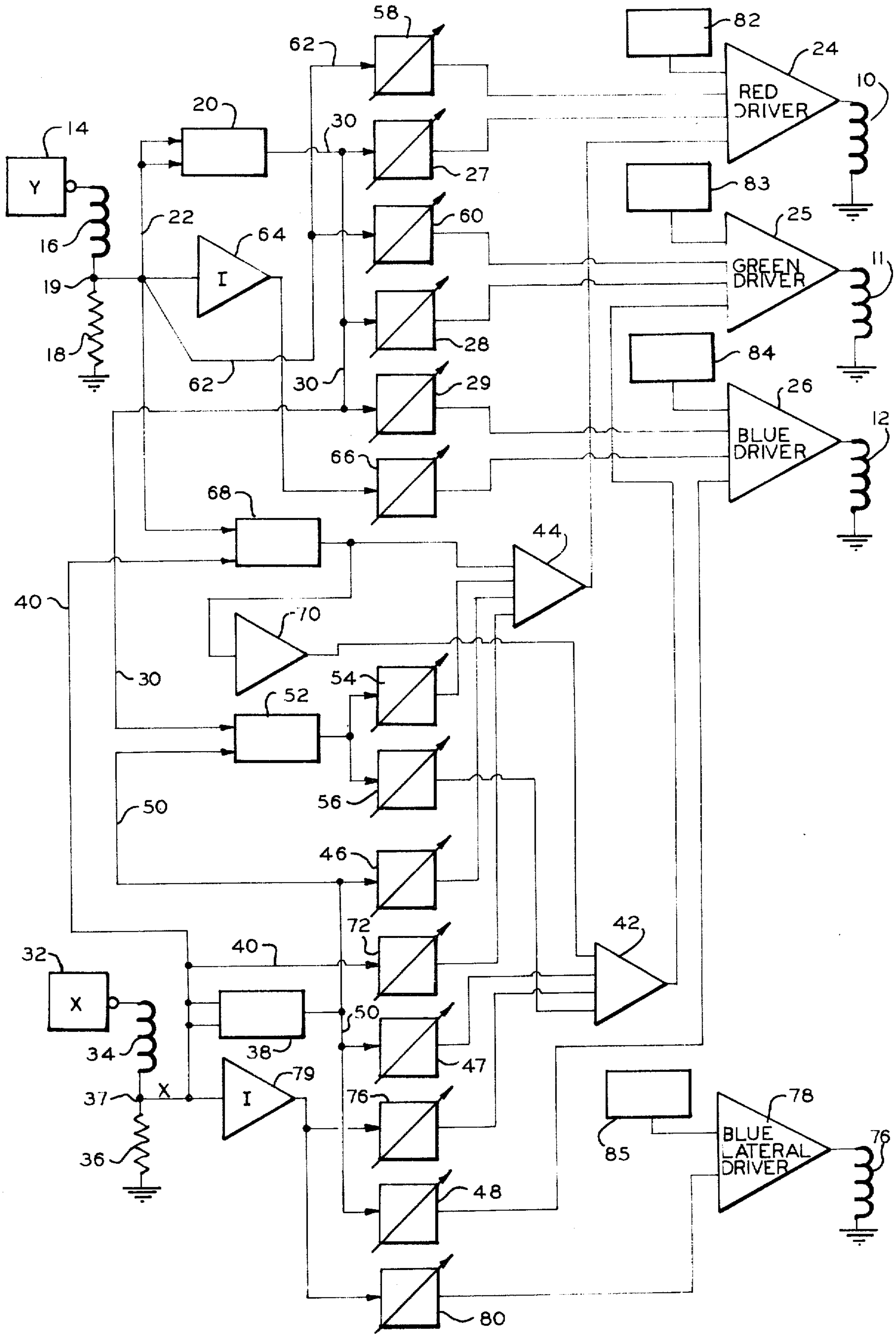
Y
X
I
I
RED DRIVER
GREEN DRIVER
BLUE DRIVER
BLUE LATERAL DRIVER

COLOR CONVERGENCE APPARATUS FOR A COLOR TELEVISION TUBE

This is a continuation of application Ser. No. 287,523 filed Sept. 8, 1972, which is a continuation-in-part of Ser. No. 138,492 filed Apr. 29, 1971, both now abandoned.

BACKGROUND OF THE INVENTION

1. Field of the Invention

This invention relates to color CRT displays and more particularly to circuitry for providing color convergence in a tricolor TV tube of the shadow mask type.

2. Description of the Prior Art

In a tri-color tube of the shadow mask type, three electron guns are tilted to provide beams that converge towards the center of the screen of the tube. The beams respectively provide the colors red, green and blue on the screen. Deflection of the beams to other locations on the screen is provided by a pair of coils, referred to as a deflection yoke, disposed around a portion of the neck of the tube. One of the coils of the deflection yoke provides for deflection in a vertical direction and the other provides for deflection in a horizontal direction. Deflection currents flowing through the yoke cause a deflection of the beams as a known function thereof by creating an electromagnetic field through which the beams pass. The simultaneous deflection of the beams to the same location on the screen (called color convergence) is always desired in the tri-color tube; poor color convergence causes a distortion of displayed images.

The three electron guns are usually near the base of the tube where they are radially disposed from the axis extending between the centers of the screen and the base.

In one type of display, the converged beams of the tube are successively swept at a constant rate along horizontal lines from left to right, the first line being at the top of the tube and the last line being at the bottom of the tube. After a line is swept, the beams are deflected during a horizontal flyback time to the left and slightly downward to the beginning of the next succeeding line. After the bottom line is swept, the beams are deflected during a vertical flyback time to the beginning of the first line. The array of swept lines is known in the art as a raster. An image is provided by causing the tube to be brightened at selective locations on the raster by intensity modulating the three guns. In a raster swept tube where the sweep rate of the raster remains unchanged, color convergence is achieved by respectively providing to three convergence coils sawtooth voltages having instantaneous amplitudes related to the location of the beams on the raster combined with voltages related to the time integral of the sawtooth voltages. Exemplary of the combining of the sawtooth voltages and the integrals thereof is the disclosure in the Bull U.S. Pat. No. 3,340,422.

In other types of displays, the beams are directed to trace characters of any desired font instead of tracing a raster. Displays of this type, referred to as stroke written displays, utilize complex circuits to achieve color convergence.

In all of the circuits for color convergence known in the prior art, they are mainly applicable to raster swept tubes where the sweep rate of the raster remains unchanged. Apparatus for providing color convergence in a tube where rasters of different sweep rates may be utilized or in a stroke written display is complex and hence unreliable.

SUMMARY OF THE INVENTION

An object of the present invention is to provide for color convergence in a tri-color shadow mask TV tube.

Another object of the present invention is to provide for color convergence in a tri-color shadow mask TV tube where the electron beams may be displaced to trace characters of any font.

According to the present invention, apparatus responsive to horizontal and vertical deflection currents in the deflection yoke of a shadow mask tri-color TV tube provides components of convergence currents to first and second convergence coils which current components are proportional to or vary as the values of the respective squares of said deflection currents; additional components of convergence currents may be provided to said first and second coils which are proportional to the values of said deflection currents, the product of said deflection currents, the product of the squares of said deflection currents, and a constant; said apparatus provides current to a third convergence coil which current is proportional to or varies as the sum of the values of the square of said vertical deflection current and the square of said horizontal deflection current; an additional convergence current may be provided to said third coil in proportion to the value of said vertical deflection current; a lateral convergence current proportional to the horizontal deflection may be provided to a lateral convergence coil.

Apparatus in accordance with the present invention provides for color convergence in tubes which are raster swept or have their beams deflected in any other manner.

Other objects, features and advantages of the present invention will become more apparent in the light of the following detailed description of a preferred embodiment thereof as illustrated in the accompanying drawing.

BRIEF DESCRIPTION OF THE DRAWING

The sole FIGURE herein is a schematic block diagram of a preferred embodiment of the present invention.

DESCRIPTION OF THE PREFERRED EMBODIMENT

In the preferred embodiment, a tri-color TV tube has three electron guns which provide three electron beams respectively associated with the colors red, green and blue. The three guns are respectively referred to as a red gun, a green gun and a blue gun hereinafter. The beams are deflected to locations on the screen of the tube in proportion to a horizontal deflection current and to a vertical deflection current provided in the coils of a deflection yoke mounted around the neck of the tube. Prior to entering the field of the deflection yoke, referred to as a deflection field hereinafter, the three beams are directed through the field of a color convergence yoke which is also mounted around the neck of the tube. In the present invention, the coils of the color convergence yoke have convergence currents flowing therein which are representative of selected functions of the deflection currents whereby color convergence is achieved at all locations on the screen.

The guns are disposed near the base of the tube (not shown) radially from an axis between the centers of the base and the screen of the tube. The blue, the red and the green guns are separated by 120° arcs, respectively, along a circle defined by the radius of their disposition. Typically, the red and green guns are in horizontal alignment below the horizontal diameter of the circle and the blue gun is on the vertical diameter, above the red and green guns.

Referring now to the drawing, radial convergence coils 10–12 of a color convergence yoke provide convergence fields for the electrons from the red, the green and the blue guns, respectively. The convergence fields are provided in response to convergence currents which are introduced into the coils 10–12. The convergence fields are a magnetic equivalent to mechanically tilting the guns in a radial direction, the tilting of each gun being proportional to the field strength associated therewith whereby the beams therefrom are tilted. In accordance with the present invention, convergence currents in the coils 10–12 are proportional to or vary as the squares of each of the deflection currents to achieve color convergence because the entry of the beams into the deflection field is off the axis.

Because of the entry off the axis, an upward deflection causes the beam from the blue gun to be within the deflection field over a shorter distance than the beams from the red and the green guns. Deflection of a beam is proportional to its distance within the deflection field. Therefore (in the absence of the convergence fields), an upward deflection causes the beam from the blue gun to be projected on a different location of the screen from the location of the projection of the beams from the red and the green guns. Similarly, a horizontal deflection causes all of the beams to be within the deflection field over different distances. When, for example, the red gun is disposed to the left of the green gun, deflection to the left causes the beam from the red gun to be within the deflection field over a shorter distance than the beam from the green gun. Since the blue guns's horizontal disposition is intermediate to the horizontal disposition of the red and the green gun the beam from the blue gun is in the deflection field over a distance intermediate to the distance in the field of the beams from the red and the green guns. Therefore, a horizontal deflection causes the beams from each of the guns to be projected on different locations of the screen.

In the present invention, convergence is achieved by providing in the coils 10–12 convergence currents which are proportional to or vary as the squares of the deflection currents. Additionally, color convergence at the corners of the screen may be achieved by providing in the coils 10, 11 components of convergence currents proportional to the product of the squares of the deflection currents; to prevent the three guns from providing different tilted images, the coils 10–12 may be provided components of convergence currents proportional to the vertical deflection current; to prevent the red and the green guns from providing images tilted with respect to each other, components of convergence currents may be provided in the coils 10, 11 proportional to the product of the deflection currents; to prevent images from the red and green guns from being tilted with respect to the images from the blue gun, components of convergence currents may be provided in the coils 10, 11 proportional to the horizontal deflection current.

Because small construction differences cause differences in the effects of the deflection field upon color convergence, the convergence currents provided to the coils 10–12 may vary from one type of tube to another or between tubes of the same type and some of the components of convergence current may not be provided.

In providing the convergence currents, a vertical deflection current source 14 is connected to the vertical deflection coil 16 of a deflection yoke in series with a resistor 18 (typically 1 ohm) having an end thereof connected to ground. Because substantially all of the vertical deflection current flows through the resistor 18, the voltage provided at a junction 19 of the coil 16 with the resistor 18 is proportional to the vertical deflection current. The voltage at the junction 19 is referred to as the Y voltage hereinafter. The junction 19 is connected to both of the inputs of a multiplier circuit 20 through a signal line 22. The multiplier 20 provides an output voltage which is proportional to or varies as the product of the voltages applied at its inputs, thereby providing a voltage proportional to the square of the Y voltage. The multiplier 20, which is of a type well known in the art, may be a model 422A manufactured by Analog Devices, Inc. of Cambridge, Massachusetts, or any other suitable multiplier.

The output of the multiplier 20 is connected to the inputs of driver amplifiers 24-26, respectively through adjustable attenuation networks 27–29 via a signal line 30. The outputs of the amplifiers 24–26 are respectively connected to the coils 10–12. The amplifiers 24–26 are current amplifiers of the type which provide a current proportional to the sum of the voltages applied at the inputs thereof. Therefore, components of current which are proportional to the square of the Y voltage are provided in the coils 10–12. The networks 27–29 and all other adjustable attenuation networks referred to hereinafter are used to provide selected proportionalities of the components of the convergence currents.

It should be understood that the attenuation network may be a potentiometer connected as a voltage divider or any other suitable network.

Similar to the connection of the source 14 to the coil 16, a horizontal deflection current 32 is connected to the horizontal deflection coil 34 of the deflection yoke in series with a resistor 36 having one end connected to ground. Because substantially all of the horizontal deflection current flows through the resistor 36, the voltage provided at a junction 37 of the coil 34 with the resistor 36 is proportional to the horizontal deflection current. The voltage at the junction 37 is referred to as the X voltage hereinafter. The junction 37 is connected to both of the inputs of a multiplier circuit 38 (similar to the multiplier circuit 20) through a signal line 40. The multiplier 38 provides a voltage proportional to the square of the X voltage. The output of the multiplier 38 is connected to an input of the amplifier 26, a voltage summing amplifier 42 and an input of a voltage summing amplifier 44, respectively through adjustable attenuation networks 46–48 via a signal line 50. The amplifiers 42, 44 provide output voltages in proportion to the sum of their respective input voltages. The outputs of the amplifiers 42, 44 are respectively connected to inputs of the amplifiers 24, 25. Therefore components of convergence currents which are proportional to the square of the X voltage is provided in the coils 10–12.

In providing convergence currents to the coils 10, 11 for color convergence near the corners of the screen, a voltage which is proportional to or varies as the product of the squares of the X and the Y voltages is provided by a multiplier circuit 52 (similar to the multiplier 20). The inputs of the multiplier 52 are connected to the outputs of the multipliers 20 and 38 through the lines 30 and 50 respectively. The output of the multiplier 52 is connected to inputs of the amplifiers 42, 44 through adjustable attenuation networks 54, 56. Thereafter, components of convergence currents which are proportional to the product of the squares of the X and the Y voltages are provided in the coils 10, 11 through amplifiers 24 and 25 respectively.

In providing convergence currents in the coils 10–12 to prevent the three guns from providing differently tilted images, voltages proportional to the Y voltage are provided from the junction 19 to the amplifiers 24, 25 through adjustable attenuation networks 58, 60, respectively, via a signal line 62 whereby components of convergence current proportional to the Y voltage are provided to the coils 10, 11. The junction 19 is connected to the input of an inverter 64 which provides an output voltage (referred to as an inverse voltage hereinafter) equal to but of opposite polarity from the voltage input thereto. The output of the inverter 64 is connected through an adjustable attenuation network 66 to an input of the amplifier 26. Therefore a component of convergence current proportional to the inverse of the Y voltage is provided in the coil 12. The components of convergence current provided in the coils 10, 11 are inversely related to the component of convergence current (proportional to the Y voltage) provided in the coil 12 because a vertical deflection which causes the beams from the red and green guns to be in the deflection field over a longer distance causes the beam from the blue gun to be in the deflection field over a shorter distance and vice versa.

In providing components of convergence current in the coils 10, 11 to prevent a tilting of the beams from the red and the green guns with respect to each other, a voltage proportional to the product of the X and Y voltages is provided by a multiplier circuit 68 (similar to the multiplier 20). The inputs of the multiplier 68 are connected to the terminals 19 and 37 through the lines 20 and 40 respectively. The output of the multiplier 68 is connected to an input of the amplifier 44 and the input of an inverter 70. The output of the inverter 70 is connected to an input of the amplifier 42. Therefore, a component of convergence current proportional to the positive product of the X and the Y voltages is provided in the coil 10 and a component of convergence current proportional to the negative of the product of the X and the Y voltages is provided in the coil 11.

In providing components of convergence currents in the coils 10, 11 to prevent a tilting of the images from the red and the green guns with respect to the image from the blue gun, an input of the amplifier 44 is connected to the terminal 37 through an adjustable attenuation network 72 via the signal line 40. An inverter 79, similar to the inverter 64, has its output connected to the terminal 37 and its output connected to an input of the amplifier 42 through an adjustable attenuation network 76. Therefore, a component of convergence current proportional to the X voltage is provided in the coil 10 and a component of convergence current proportional to the inverse to the component provided in the coil 10 is provided to the coil 11.

A lateral convergence coil 76 may be mounted around the neck of the tube for tilting the beam from the blue gun in a direction tangent to the radius referred to hereinabove. Accordingly, an amplifier 78 has its input connected to the output of the inverter 79 through an adjustable attenuation network 80 whereby a lateral convergence current proportional to the inverse of the X voltage is provided in the coil 76. Tilting in the tangent direction may be necessary to converge the beam from the blue gun with the beams from the red and green guns where there are slight mechanical misalignments of the guns.

DC voltage sources 82–85 are respectively connected to inputs of the amplifiers 24–26, 78 for providing DC alignment currents in the coils 10–12, 76 to provide a desired alignment of the beams from the three guns.

Thus there has been shown apparatus for providing color convergence in a tri-color TV tube of the shadow mask type.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. Apparatus for providing convergence of the three beams from three electron guns, respectively, in a tri-color TV tube of the shadow mask type, the guns being disposed along a circle radially from an axis extending between the center of the screen and the base of the tube, deflection of the three beams on the screen of the tube being responsive to both periodic currents and non-periodic currents provided to the horizontal and vertical coils of a deflection yoke around the neck of the tube, said tube also having a convergence yoke comprised of at least three convergence coils respectively corresponding to said guns, for providing additional deflection to each of said respective guns in response to convergence currents provided to each convergence coil comprising:

first and second sensing means connected to the horizontal and vertical deflection coils respectively for providing horizontal and vertical signals proportional to the horizontal and vertical deflection currents, including providing said horizontal and vertical signals when said deflection currents are periodic and when said deflection currents are non-periodic;

first and second multiplying means connected to said first and second sensing means respectively, said first multiplying means being responsive to said horizontal signal and providing a first output signal proportional to the square of said horizontal signal, including providing said first signal when said horizontal signal is representative of a periodic signal and when said horizontal signal is representative of a non-periodic signal, said second multiplying means being responsive to said vertical signal and providing a second output signal proportional to the square of said vertical signal, including providing said second signal when said vertical signal is representative of a periodic signal and when said vertical signal is representative of a non-periodic signal;

signal attenuating means connected to said horizontal, vertical, first and second signals for providing a plurality of selectively attenuated signals, including at least one attenuated signal for each of said horizontal, vertical, first and second signals; and first, second and third combining means, each responsive to selected ones of said attenuated signals and each providing a convergence current representative of a combination of said attenuated signals to one of the convergence coils for providing convergence to the beams of the three electron guns when said beams are deflected in response to periodic currents and when said beams are deflected in response to non-periodic currents.

2. The apparatus of claim 1 wherein each of said combining means are responsive to said attenuated first and second signals.

3. Apparatus according to claim 2 additionally comprising third multiplying means responsive to said first and second signals provided by said first and second multiplying means for providing in two of said convergence coils components of convergence current proportional to the product of said first and second signals.

4. The apparatus of claim 2 wherein each of said combining means are responsive to said vertical signal.

5. The apparatus of claim 2 wherein two of said combining means are responsive to said horizontal signal.

6. Apparatus according to claim 2 additionally comprising fourth multiplying means responsive to said horizontal and vertical signals provided by said first and second sensing means for providing in two of said convergence coils components of convergence current proportional to the product of said horizontal and vertical signals.

7. Apparatus according to claim 2 wherein said guns include a blue gun aligned along a vertical diagonal of said circle, additionally comprising:

amplifier means responsive to said first sensing means for providing a lateral convergence current proportional to said horizontal signal; and a lateral convergence coil, mounted around the neck of the tube and connected to said amplifier means to conduct said lateral convergence current, for tilting the beam of said blue gun in a direction tangent to the circle in response to said lateral convergence current.

* * * * *